UNITED STATES PATENT OFFICE 2,478,875

PREPARATION OF HYDROGEN CYANIDE

David R. Merrill, Moorestown, N. J., and William A. Perry, Bristol, Pa., assignors to Rohm & Haas Company, Philadelphia, Pa., a corporation of Delaware No Drawing. Application March 27, 1948, Serial No. 17,592

7 Claims. (Cl. 23—151)

This invention concerns the preparation of hydrogen cyanide in optimum yields with high efficiency of operation by purifying natural gas, mixing it within definite ratios with air and ammonia, and reacting this mixture by passing it over a hot catalyst body.

Proposals have already been made for reacting gaseous or vaporizable hydrocarbons, whether aliphatic, cycloaliphatic, or aromatic, including mixtures of hydrocarbons, with ammonia and oxygen on a catalyst body, such as a noble metal or alloy thereof, to form hydrogen cyanide. When commercially available mixtures of hydrocarbons are used for this reaction and the procedures heretofore known are followed, the process does not attain the highest level of economic feasibility. The direct use of commercially available mixtures of hydrocarbons does not lead to the good yields which are now found possible. Such mixtures do not permit the control of the reaction which is necessary to accomplish this end. On the other hand, the preparation of a single pure hydrocarbon is not an economically practical way of overcoming the deficiencies of the prior art.

When natural gas is used as a cheap source of hydrocarbons and mixed with air and ammonia, as in the prior art, difficulties are at once encountered. Neither yields nor conversions reach the level which has now been found possible. Furthermore, the mediocre to poor conversions which are obtained after the start of an operation do not tend to improve as the operation proceeds and generally become even poorer. The catalyst rapidly becomes fouled with carbon, even with a generous excess of oxygen. Even when a high proportion of air is used in the reaction mixture, as shown in the prior art, the bad effects are still not effectively overcome. Temperatures are increased at the catalyst unit and the catalyst life tends to be short, at best. Furthermore, there is a greater decomposition of ammonia as the temperature rises. Carbon still deposits. The deposition of carbon on a catalyst gauze becomes progressively more serious and the catalyst life becomes even shorter. Frequent interruptions for regeneration are necessary and, in not too long a time, replacement of catalyst is needed. This prevents the prior art processes from attaining the economic feasibility which might recommend this reaction as a practical one for the production of hydrogen cyanide from cheap and readily available raw materials.

In spite of these unpromising prospects, we have found that natural gas can be utilized as a source of hydrocarbons for the production of hydrogen cyanide when this gas is purified within the limits defined below and reacted with air and ammonia under the conditions hereinafter specified. We have thus found ways and means to provide a significant and substantial increase in yield of the desired product coupled with a remarkable increase in efficiency in the operation of the process.

We have discovered that when natural gas is substantially free of hydrocarbons having three or more carbon atoms and treated to contain not over 7.5% of ethane, it may then be mixed with air and ammonia in favorable proportions and reacted therewith on a catalyst to form hydrogen cyanide in high, sustained yields with long life of the catalyst.

The step of purifying natural gas for purposes of this invention requires the substantially complete removal of the small amounts of propane, butanes, hexanes, or like higher hydrocarbons which are normally present in natural gas. At the same time, the content of ethane is controlled so as not to exceed 7.5% of the purified gas. There are several methods which may be applied to meet these requirements.

One method which may be used is absorption with reflux. In this method, a liquid hydrocarbon is caused to flow countercurrently to the stream of natural gas. The liquid absorbs the relatively high molecular weight hydrocarbons contained in the gas with only small absorption of lower hydrocarbons. This permits segregation of most of the methane together with some ethane. By the heating of the absorbing liquid, the absorbed higher gaseous hydrocarbons can be boiled out and removed from the liquid. A portion of these hydrocarbons is used to provide vapor reflux at the bottom of the absorption column, thus increasing the efficiency of the process. The absorbing liquid may then be recycled. There are variations of this procedure which will be obvious to those familiar with this type of absorption.

An alternative method for purifying natural gas to meet the requirements of this invention utilizes adsorption on activated carbon. This may be accomplished by passage of natural gas through a column or chamber packed with an activated charcoal. The charcoal takes up the relatively heavier components of natural gas and allows methane and most of the ethane to pass through. When the charcoal begins to allow an increasing concentration of ethane to leave it and before propane or higher hydrocarbons are liberated therefrom, the use of the charcoal in this column or chamber is discontinued. Where one or more additional adsorption units are provided, the flow of gas is switched to a fresh unit and the exhausted unit is revivified. This permits continuous operation.

An alternative scheme for removing the undesired hydrocarbons is through adsorption on charcoal which is flowed countercurrently to the stream of natural gas in a tower. This method permits continuous operation with regeneration of charcoal taken from the bottom of the tower and return of the revivified charcoal to the top of the tower. The charcoal is readily revivified by heat, particularly with a stripping gas or steam, which drives off the adsorbed hydrocarbons.

Natural gas varies somewhat in its composition as it is obtained from different fields. Yet any of the mixtures available are amenable to treatments such as just described to purify the gas within the required limits. The following analyses show typical compositions of natural gas from several sources:

Analysis A (by mass spectrograph):

|  | Per cent |
|---|---|
| Methane | 91.58 |
| Ethane | 4.75 |
| Propane | 2.00 |
| n-Butane | 0.30 |
| Nitrogen | 0.97 |
| Carbon dioxide | 0.40 |

Analysis B (by Podbielniak method):

| | |
|---|---|
| Methane | 91.29 |
| Ethane | 4.82 |
| Propane | 1.19 |
| iso-Butane | 0.39 |
| n-Butane | 0.16 |
| Pentanes | 0.33 |
| Nitrogen | 0.79 |
| Carbon dioxide | 1.05 |

Neither of these types of natural gas as obtained gives a good yield of hydrogen cyanide when mixed with air and ammonia and reacted therewith on a catalyst. Both cause carbon to deposit on the catalyst. If the amount of air is increased to lessen the rate of carbon deposition, the reaction temperature rises and the life of the catalyst is decreased with decreasing conversion to the desired product.

Yet either of these gases, when freed from detectable amounts of propane or higher hydrocarbons, gives a good yield of hydrogen cyanide. These gases or other natural gases are rendered essentially free of propane or heavier hydrocarbons and then mixed with air and ammonia in proportions to give 1.2 to 1.45 moles of oxygen per mole of ammonia, 1.15 to 1.35 moles of carbon per mole of ammonia, and 1.05 to 1.15 moles of oxygen per mole of carbon. This mixture is then passed through or over a catalyst, such as one composed of platinum gauze, operating at 1025° to 1150° C. The exact rate of passage is not critical but may, in general, vary from four to thirty feet per second at the catalyst temperature. The optimum rate for a given situation depends upon the design of apparatus and catalyst unit and is readily determinable by a few simple trials.

There results a conversion of 70% to 75% of the ammonia to hydrogen cyanide. The catalyst unit remains in good condition and permits continuous operation over long periods of time at high efficiency.

It may be noted that unsaturated hydrocarbons are not encountered in gases of natural origin such as described. If they were, as in refinery gases, their removal would be desirable to effect the high yields and the continuous operation made possible by this invention.

Natural gas was obtained from yet another source and found to contain 6.5% of ethane, 2.3% of propane, 0.6% of n-butane, and 0.33% of higher hydrocarbons along with methane and a small amount of nitrogen. This gas was mixed with air and ammonia in proportions to give molar ratios of oxygen to ammonia of 1.40, of carbon to ammonia of 1.28, and of oxygen to carbon of 1.10. The mixture was passed through a multi-layer pack of platinum-rhodium wire gauze at 1100° C. at the rate of fifteen feet per second at the catalyst temperature. It was noted that substantial carbon deposited on the catalyst and that the temperature at the catalyst increased more than 40° C. Operation, if continued under these conditions, causes the gauze to disintegrate and prevents prolonged operation of the unit. At best, the above mixture gave only 62% to 64% conversion of ammonia to hydrogen cyanide.

The same natural gas was passed through a tower filled with activated charcoal and mixed with air and ammonia in proportions to give the identical ratios used just above. This gas mixture was passed through the catalyst unit which operated below 1100° C. When the system was in equilibrium, the gas from the adsorption tower was analyzed and found to contain no propane or higher hydrocarbons and to contain 3.5% of ethane, the rest of the gas being mostly methane. The flow was adjusted to fifteen feet per second at the catalyst temperature. Conversion at this time was 74.5%.

The flow of gas through the same bed of activated charcoal was continued and the high rate of conversion was maintained for a prolonged period of time. After six hours, the content of ethane in the purified gas had increased to 7.4% without a detectable content of higher hydrocarbons. Conversion at this time was still satisfactory, being 72.6% based on the ammonia input. Shortly thereafter, the percentage of ethane exceeded 7.5% and a falling off in conversion was noted. When the gas reached an ethane content of 7.9% with a trace of propane, conversion was only 67%. Along with this decrease in conversion, it was noted that carbon was being deposited on the gauze.

It has been established that deposition of carbon inevitably leads to corrosion and disintegration of the catalyst gauze if the operation is continued. Yields fall off at the same time. If the process is interrupted to regenerate the catalyst and rid it of carbon, efficiency falls. Replacement of catalyst units under such conditions of operation is required at frequent intervals. Revivification and replacement both entail serious losses and high costs. Both of these factors, however, are minimized when the present process is followed.

As catalyst units for the reaction of hydrocarbons, oxygen, and ammonia to yield hydrogen cyanide, there are desirably used a pack of gauzes composed of platinum or platinum alloy. Platinum-iridium and platinum-rhodium alloys are recommended for this purpose. The pack is securely mounted in an apparatus lined with a high-temperature refractory. When the catalyst unit is constructed and mounted in accordance with methods shown in our application Serial No. 763,550, filed July 25, 1947, the operation may be made continuous over long periods of time with favorable yield and high efficiency.

The gases from the catalyst unit are cooled and the hydrogen cyanide separated therefrom by any of the procedures which have been recommended for this purpose. If desired, the hydrogen cyanide may be taken up with an alkaline reagent to yield cyanides. The process of this invention presents advantages at this stage in several respects. Since the operation is performed at somewhat lower temperatures than possible without purification of natural gas, greater capacity of apparatus results and somewhat less cooling is needed. In the process, the minimum volume of gases is handled, again increasing capacity of a given apparatus. The whole process is operated with greater certainty than has heretofore been possible in the case of processes of the prior art.

Conversions of ammonia by the procedures described are readily brought above 70% of the ammonia used and may run at 74% to 76%. While a small part of the ammonia in the reaction is lost in side reactions, the better part of the unreacted ammonia is recoverable from the off-gases. With consideration of this ammonia, yields are obtained at 85% to 90% of theory, based on the ammonia introduced, when the procedures herein detailed are followed.

The process of purifying natural gas to remove propane, butane, and higher hydrocarbons normally found therein and to limit the ethane content to 7.5% and then reacting the thus-purified gas with ammonia and oxygen on a catalyst to form hydrogen cyanide marks a substantial advance in the art. The process results in higher yields, better control, and longer life of catalyst—all important factors which contribute to economic feasibility.

We claim:

1. In the preparation of hydrogen cyanide with high yields at good efficiency by reacting hydrocarbons, ammonia, and oxygen on a catalyst, the improvements which comprise effecting the reaction with hydrocarbons from natural gas which has been stripped of hydrocarbons of more than two carbon atoms and which does not contain more than 7.5% of ethane, mixing the said hydrocarbons with air and ammonia in a ratio providing 1.2 to 1.45 moles of oxygen per mole of ammonia, 1.15 to 1.35 moles of carbon per mole of ammonia, and 1.05 to 1.15 moles of oxygen per mole of carbon, and passing the resulting mixture over a catalyst.

2. The process of preparing hydrogen cyanide in good yields which comprises purifying natural gas by substantially eliminating therefrom its content of hydrocarbons of more than two carbon atoms, mixing the thus-purified natural gas with ammonia and air in proportions providing 1.2 to 1.45 moles of oxygen per mole of ammonia, 1.15 to 1.35 moles of carbon per mole of ammonia, and 1.05 to 1.15 moles of oxygen per mole of carbon, and reacting the resulting mixture on a catalyst body to form hydrogen cyanide.

3. The process of preparing hydrogen cyanide in good yields wihch comprises treating natural gas and substantially eliminating therefrom hydrocarbons of at least three carbon atoms and limiting the ethane content so as not to exceed 7.5% of the treated gas, mixing the thus-treated gas with air and ammonia in proportions of 1.2 to 1.45 moles of oxygen per mole of ammonia, 1.15 to 1.35 moles of carbon per mole of ammonia, and 1.05 to 1.15 moles of oxygen per mole of carbon, and passing the resulting mixture over a catalyst at 1025° C. to 1150° C.

4. The process of claim 3 wherein the catalyst consists of a platinum alloy.

5. The process of preparing hydrogen cyanide, which comprises purifying natural gas by stripping therefrom substantially its content of hydrocarbons of more than two carbon atoms and any ethane substantially in excess of 7½% of the purified gas, mixing the thus-purified gas with ammonia and air in reacting proportions, and reacting the resulting mixture on a catalyst body to form hydrogen cyanide.

6. The process of claim 5 wherein the reaction is effected on a platinum alloy catalyst at a temperature between 1025° C. and 1150° C.

7. The process of claim 5 wherein stripping is effected by adsorption of the hydrocarbons of more than two carbon atoms by activated carbon.

DAVID R. MERRILL.
WILLIAM A. PERRY.

REFERENCES CITED

The following references are of record in the file of this patent:

UNITED STATES PATENTS

| Number | Name | Date |
| --- | --- | --- |
| 1,934,838 | Andrussow | Nov. 14, 1933 |